(12) United States Patent
Shi et al.

(10) Patent No.: US 11,024,009 B2
(45) Date of Patent: Jun. 1, 2021

(54) SUPER RESOLUTION USING A GENERATIVE ADVERSARIAL NETWORK

(71) Applicant: Twitter, Inc., San Francisco, CA (US)

(72) Inventors: Wenzhe Shi, London (GB); Christian Ledig, London (GB); Zehan Wang, London (GB); Lucas Theis, London (GB); Ferenc Huszar, Cambridge (GB)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 15/706,428

(22) Filed: Sep. 15, 2017

(65) Prior Publication Data
US 2018/0075581 A1 Mar. 15, 2018

Related U.S. Application Data

(60) Provisional application No. 62/422,012, filed on Nov. 14, 2016, provisional application No. 62/395,186, filed on Sep. 15, 2016.

(51) Int. Cl.
 *G06T 3/40* (2006.01)
 *G06N 3/08* (2006.01)
 *G06N 3/04* (2006.01)

(52) U.S. Cl.
 CPC ......... *G06T 3/4053* (2013.01); *G06N 3/0454* (2013.01); *G06N 3/084* (2013.01);
 (Continued)

(58) Field of Classification Search
 CPC ......... G06T 3/4053; G06T 2207/20081; G06T 2207/20084; G06T 3/4046; Y04S 10/54; G06N 3/084; G06N 3/0454
 See application file for complete search history.

(56) References Cited

U.S. PATENT DOCUMENTS 5,052,043 A * 9/1991 Gaborski ............... G06N 3/084
382/157

OTHER PUBLICATIONS

Kapah "Demosaicking using artificial neural networks"; Applications of Artificial Neural Networks in Image Processing (Year: 2000).*

(Continued)

*Primary Examiner* — Mark Roz
(74) *Attorney, Agent, or Firm* — Brake Hughes Bellermann LLP (57) ABSTRACT

A neural network is trained to process received visual data to estimate a high-resolution version of the visual data using a training dataset and reference dataset. A set of training data is generated and a generator convolutional neural network parameterized by first weights and biases is trained by comparing characteristics of the training data to characteristics of the reference dataset. The first network is trained to generate super-resolved image data from low-resolution image data and the training includes modifying first weights and biases to optimize processed visual data based on the comparison between the characteristics of the training data and the characteristics of the reference dataset. A discriminator convolutional neural network parameterized by second weights and biases is trained by comparing characteristics of the generated super-resolved image data to characteristics of the reference dataset, and where the second network is trained to discriminate super-resolved image data from real image data.

10 Claims, 7 Drawing Sheets
(5 of 7 Drawing Sheet(s) Filed in Color)

(52) U.S. Cl.
CPC .. *G06T 3/4046* (2013.01); *G06T 2207/20081* (2013.01); *G06T 2207/20084* (2013.01)

(56) References Cited

OTHER PUBLICATIONS

Bruna, Super-Resolution with Deep Convolutional Sufficient Statistics, ICLR Mar. 2016 (Year: 2016).*
International Search Report and Written Opinion for PCT Patent Application No. PCT/US2017/051891, dated Dec. 20, 2017, 15 pages.
Bruna et al., "Super-Resolution with Deep Convolutional Sufficient Statistics", available online at <https://arxiv.org/pdf/1511.05666.pdf>, Mar. 2016, 17 pages.
Denton et al., "Deep Generative Image Models using a Laplacian Pyramid of Adversarial Network", available online at <https://arxiv.org/pdf/1506.05751.pdf> Jun. 18, 2015, 10 pages.
Dosovitskiy et al., "Generating Images with Perceptual Similarity Metrics based on Deep Networks", available online at <https://arxiv.org/pdf/1602.02644.pdf>, Feb. 9, 2016, 14 pages.
Johnson et al., "Perceptual Losses for Real-Time Style Transfer and Super-Resolution", available online at <https://arxiv.org/pdf/1603.08155.pdf>, Mar. 27, 2016, 18 pages.
Yeh et al., "Semantic Image Inpainting with Perceptual and Contextual Losses", available online at <https://pdfs.semanticscholar.org/a1b3/d8a94323122d63a1ec31c1d722d30c509cb4.pdf>, Jul. 26, 2016, 10 pages.
Tuzel et al., "Global-Local Face Upsampling Network", available online at <https://arxiv.org/pdf/1603.07235v1.pdf>, Mar. 23, 2016, 23 pages.

* cited by examiner

SUPER RESOLUTION USING A GENERATIVE ADVERSARIAL NETWORK

CROSS-REFERENCE TO RELATED APPLICATIONS

This is a non-provisional of, and claims priority to, U.S. Provisional Patent Application No. 62/395,186, entitled "Super Resolution Using a Generative Adversarial Network," and filed Sep. 15, 2016, and U.S. Provisional Patent Application No. 62/422,012, entitled "Photo-Realistic Single Image Super-Resolution Using a Generative Adversarial Network," and filed Nov. 14, 2016, both of which is incorporated herein by reference.

TECHNICAL FIELD

This disclosure relates to machine learning to process visual data using a plurality of datasets.

BACKGROUND

Machine learning is the field of study where a computer or set of computers learn to perform classes of tasks using feedback generated from the experience the machine learning process gains from computer performance of those task. Supervised machine learning is concerned with a computer learning one or more rules or functions to map between example inputs and desired outputs as predetermined by an operator or programmer, usually where a dataset containing the inputs is labelled. Unsupervised learning may be concerned with determining a structure for input data, for example, when performing pattern recognition, and typically uses unlabelled datasets. Semi-supervised machine learning makes use of externally provided labels and objective functions as well as any implicit data relationships.

When initially configuring a machine learning system, particularly when using a supervised machine learning approach, the machine learning algorithm can be provided with some training data or a set of training examples, in which each example is typically a pair of an input signal/vector and a desired output value, label (or classification) or signal. The machine learning algorithm analyzes the training data and produces a generalized function that can be used with unseen datasets to produce desired output values or signals for the unseen input vectors/signals. Generally, the user determines what type of data is to be used as the training data and also prepares a representative real-world set of data. However, the user must take care to ensure that the training data contains enough information to accurately predict desired output values. The machine learning algorithm must be provided with enough data to be able to correctly learn and model for the dimensionality of the problem that is to be solved, without providing too many features (which can result in too many dimensions being considered by the machine learning process during training). The user also can determine the desired structure of the learned or generalized function, for example, whether to use support vector machines or decision trees.

The use of unsupervised or semi-supervised machine learning approaches are often used when labelled data is not readily available, or where the system generates new labelled data from unknown data given some initial seed labels.

For example, for the case where machine learning is used for image enhancement, using dictionary representations for images, techniques are generally referred to as dictionary learning. In dictionary learning, where sufficient representations, or atoms, are not available in a dictionary to enable accurate representation of an image, machine learning techniques can be employed to tailor dictionary atoms such that they can more accurately represent the image features and thus obtain more accurate representations.

When using machine learning where there is an objective function and optimization process, for example, when using sparse coding principles, a training process can be used to find optimal representations that can best represent a given signal or labelling (where the labelling can be externally provided such as in supervised or semi-supervised learning or where the labelling is implicit within the data as for unsupervised learning), subject to predetermined initial conditions such as a level of sparsity.

Many current methods of neural-network super resolution use a least squares objective or a variant thereof such as peak signal-to-noise (PSNR) ratio. Generally, the training objective of minimizing a least squares error (MSE) is represented by:

$$\min_\theta \mathbb{E}_{x,y} \|y - \hat{y}(x;\theta)\|_2^2$$

where x is a low-resolution image, y is a high-resolution image, and $\hat{y}$ is an estimate of the high-resolution image generated by a neural network with the parameters of $\theta$.

Least squares methods struggle when there are multiple equivalently probable solutions to the problem. For example, where there are multiple equivalently good solutions to the problem, a low-resolution image may provide enough detail to be able to determine the content of the image, but not in enough details to be able to precisely determine the location of each object within a high-resolution version of the image.

Also, despite the breakthroughs in accuracy and speed of single image super-resolution using faster and deeper convolutional neural networks, a central problem remains largely unsolved: How to recover lost texture detail from large downsampling factors. During image downsampling, information is lost, making super-resolution a highly ill-posed inverse problem with a large set of possible solutions. The behavior of optimization-based super-resolution methods is therefore principally driven by the choice of objective function. Recent work has largely focused on minimizing the mean squared reconstruction error (MSE). The resulting estimates can have high peak signal-to-noise-ratio (PSNR), but they are often blurry or overly-smoothed, lack high-frequency detail, making them perceptually unsatisfying.

SUMMARY

In a general aspect, a method for training an algorithm to process at least a section of received low resolution visual data to estimate a high resolution version of the low resolution visual data using a training dataset and a reference dataset includes: (a) generating a set of training data (e.g., by using the generator neural network of (b)); (b) training a generator neural network by comparing one or more characteristics of the training data to one or more characteristics of at least a section of the reference dataset, wherein the first network is trained to generate super-resolved image data from low resolution image data and wherein the training includes optimizing processed visual data based on the comparison between the one or more characteristics of the training data and the one or more characteristics of the reference dataset; and (c) training a discriminator neural network by comparing one or more characteristics of the generated super-resolved image data to one or more characteristics of at least a section of the reference dataset, wherein the second network is trained to discriminate super-resolved image data from real image data.

Implementations can include one or more of the following features, alone or in any combination with each other. For example, the steps (a), (b), and (c) can be iterated over and the training data can be updated during an iteration. The order of the steps (a), (b), and (c) can be selected to achieve different goals. For example, performing (a) after (b) can result in training the discriminator with an updated (and improved) generator. The generator neural network and/or the discriminator neural network can be convolutional neural networks. The generator neural network and/or the discriminator neural network can be parameterized by weights and biases. The weights and biases that parameterize the generator and the discriminator networks can be the same or they can differ. The training dataset can include a plurality of visual data. The reference dataset can include a plurality of visual data. The plurality of visual data of the reference dataset may or may not be not be increased quality versions of the visual data of the training dataset. The estimated high-resolution version can be used for any of: removing compression artifacts, dynamic range enhancement, image generation and synthesis, image inpainting, image de-mosaicing, and denoising. The discriminating of the super-resolved image data from real image data can include using a binary classifier that discriminates between the super-resolved image data and reference data. Comparing the one or more characteristics of the training data to the one or more characteristics of at least a section of the reference dataset can include assessing the similarity between one or more characteristics of an input of the algorithm and one or more characteristics of an output of the algorithm. The algorithm can be hierarchical and can include a plurality of layers. The layers can potentially be arbitrarily connected with each other or any of sequential, recurrent, recursive, branching, recursive or merging.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

As described herein, a super-resolution generative adversarial network (SRGAN) provides a framework that is based on a generative adversarial network (GAN) and is capable of recovering photo-realistic images from 4× downsampled images. With SRGAN, a perceptual loss function that consists of an adversarial loss function and a content loss function is proposed. The adversarial loss pushes the solution to the natural image manifold using a discriminator network that is trained to differentiate between the super-resolved images and original photo-realistic images push the solution to the natural image manifold using a discriminator network. In addition, a content loss function motivated by perceptual similarity instead of similarity in pixel space is used. Trained on a large number (e.g., tens or hundreds of thousands) of images using the perceptual loss function, the deep residual network can recover photo-realistic textures from heavily downsampled images on public benchmarks.

The highly challenging task of estimating a high-resolution (HR), ideally perceptually superior image from its low-resolution (LR) counterpart is referred to as super-resolution (SR). Despite the difficulty of the problem, research into SR has received substantial attention from within the computer vision community. The wide range of applications includes face recognition in surveillance videos, video streaming and medical applications.

A major difficulty when estimating the HR image is the ambiguity of solutions to the underdetermined SR problem. The ill-posed nature of the SR problem is particularly pronounced for high downsampling factors, for which texture detail in the reconstructed SR images is typically absent. Assumptions about the data must be made to approximate the HR image, such as exploiting image redundancies or employing specifically trained feature models.

Recently, substantial advances have been made in image SR, with early methods based on interpolation, simple image features (e.g. edges) or statistical image priors. Later example-based methods detected and exploited patch correspondences within a training database or calculated optimized dictionaries allowing for high-detail data representation. While of good accuracy, the involved optimization procedures for both patch detection and sparse coding are computationally intensive. More advanced methods formulate image-based SR as a regression problem that can be tackled, for example, with Random Forests. The recent rise of convolutional neural networks (CNNs) also has impacted image SR, not only improving the state of the art with respect to accuracy but also computational speed, enabling real-time SR for 2D video frames.

Figure 1A:
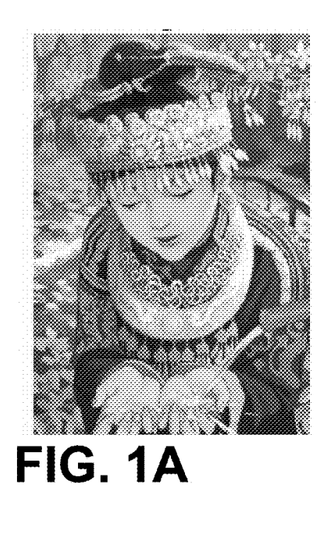
FIG. 1A is an example original image of a high-resolution image.
Figure 1B:
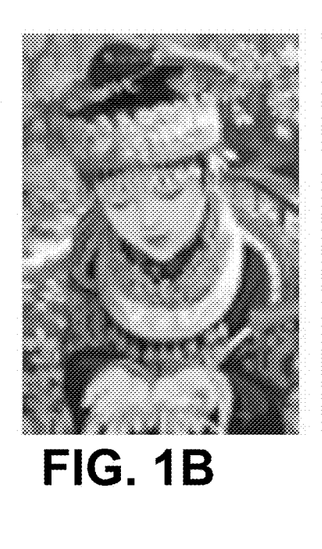
FIG. 1B is an example image generated from a 4× downsampled version of the image of FIG. 1A, where the image in FIG. 1B is generated using bi-cubic interpolation techniques on data in the downsampled image.
Figure 1C:
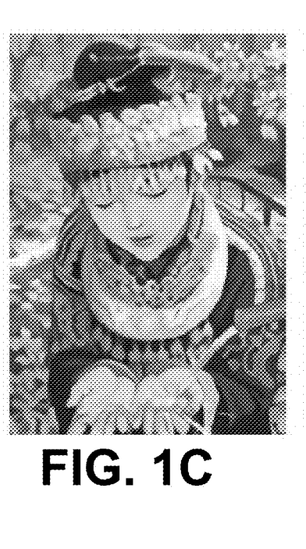
FIG. 1C is an example image generated from the 4× downsampled version of the image of FIG. 1A, where the image in FIG. 1C is generated from data in the downsampled image using a deep residual network optimized for MSE.
Figure 1D:
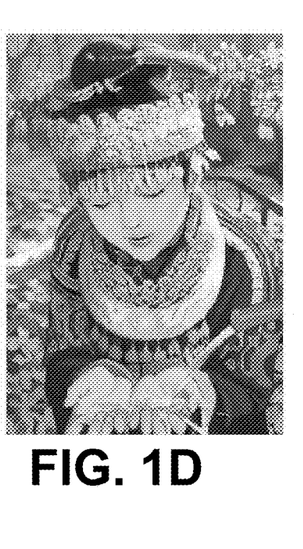
FIG. 1D is an example image generated from a 4× downsampled version of the image of FIG. 1A, where the image in FIG. 1D is generated from data in the downsampled image using a deep residual generative adversarial network optimized for a loss more sensitive to human perception.

The optimization target of supervised SR algorithms often is the minimization of the mean squared error (MSE) of the recovered HR image with respect to the ground truth. This is convenient as minimizing MSE also maximizes the peak signal to noise ratio (PSNR), which is a common measure used to evaluate and compare SR algorithms. However, the ability of MSE (and PSNR) to capture perceptually relevant differences, such as high texture detail, good contrast and defined edges, is very limited as they are defined based on pixel-wise image differences. For example, as shown in FIGS. 1A, 1B, 1C, and 1D, the highest PSNR does not necessarily reflect the perceptually better SR result. FIG. 1A is an example original image of a high-resolution image. FIG. 1B is an example image generated from a 4× downsampled version of the image of FIG. 1A, where the image in FIG. 1B is generated using bi-cubic interpolation techniques on data in the downsampled image. The image in FIG. 1B has a PNSR of 21.69 dB. FIG. 1C is an example image generated from the 4× downsampled version of the image of FIG. 1A, where the image in FIG. 1C is generated from data in the downsampled image using a deep residual network optimized for MSE. The image in FIG. 1C has a PNSR of 23.62 dB. FIG. 1D is an example image generated from a 4× downsampled version of the image of FIG. 1A, where the image in FIG. 1D is generated from data in the downsampled image using a deep residual generative adversarial network optimized for a loss more sensitive to human perception. The image in FIG. 1D has a PNSR of 21.10 dB.

A perceptual difference between a super-resolved version of a downsampled image and an original version of the image means that the super-resolved images are not generally considered as photo-realistic, at least in terms of the level of image fidelity/details expected for a given resolution of the image.

Figure 2A:
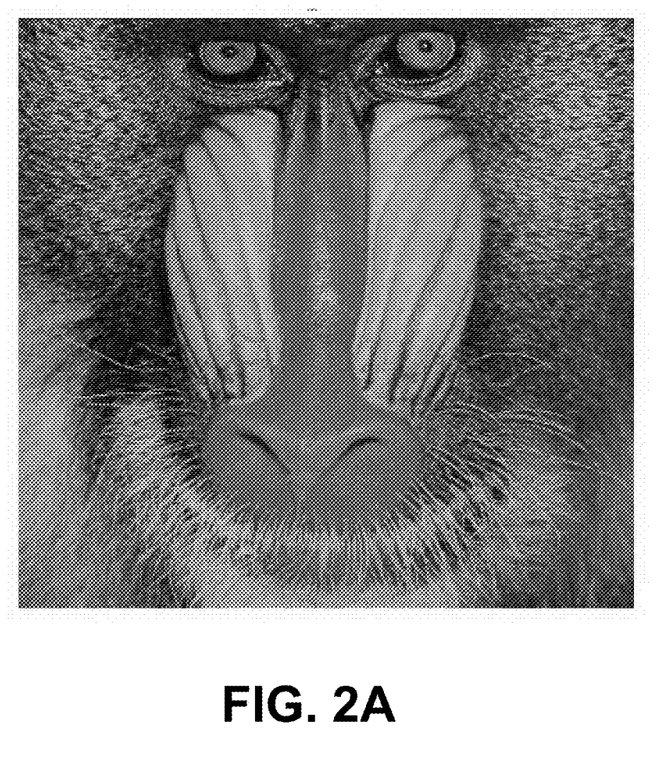
FIG. 2A is an example high resolution image.
Figure 2B:
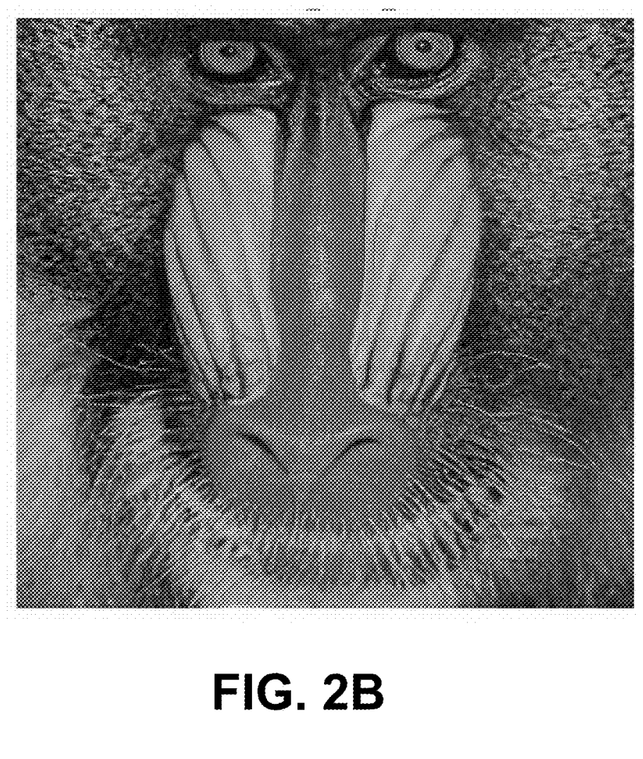
FIG. 2B is a super-resolved image created using the techniques described herein from a 4× downsampled version of the image shown in FIG. 2A.

In the techniques described herein, we propose super-resolution generative adversarial network (SRGAN) for which we employ a deep residual network and diverge from MSE as the sole optimization target. Different from previous works, we define a novel perceptual loss using high-level feature maps of the Visual Geometry Group(VGG) network combined with a discriminator that encourages solutions perceptually hard to distinguish from the HR reference images. An example of a photo-realistic image that was super-resolved from a 4× downsampling factor using SRGAN is shown in FIG. 2B, which is a SR image created using the techniques described herein from a 4× downsampled version of the original image shown in FIG. 2A.

The techniques described herein are described in connection with single image super-resolution (SISR) but are also applicable to recovering high resolution images from multiple images, such as object images acquired from varying viewpoints or temporal sequences of image frames (e.g., recorded or live video data).

Design of Convolutional Neural Networks

The state of the art for many computer vision problems can be expressed by specifically designed Convolutional Neural Networks (CNN) architectures. Although deeper network architectures can be difficult to train, they have the potential to substantially increase the network's accuracy as they allow modeling mappings of very high complexity. To efficiently train these deeper network architectures batch-normalization can be used to counteract the internal covariate shift. Deeper network architectures have also been shown to increase performance for SISR, e.g. using a recursive CNN. Another powerful design choice that eases the training of deep CNNs is the concept of residual blocks and skip-connections. Skip-connections relieve the network architecture of modeling the identity mapping that is trivial in nature, but that is, however, potentially non-trivial to represent with convolutional kernels.

In the context of SISR, learning upscaling filters can be beneficial both in terms of speed and accuracy, and can offer an improvement over using data-independent, bicubic interpolation to upscale the LR observation before feeding the image to the CNN. In addition, by extracting the feature maps in LR space, the gain in speed can be used to employ a deep residual network (ResNet) to increase accuracy.

Figure 3:
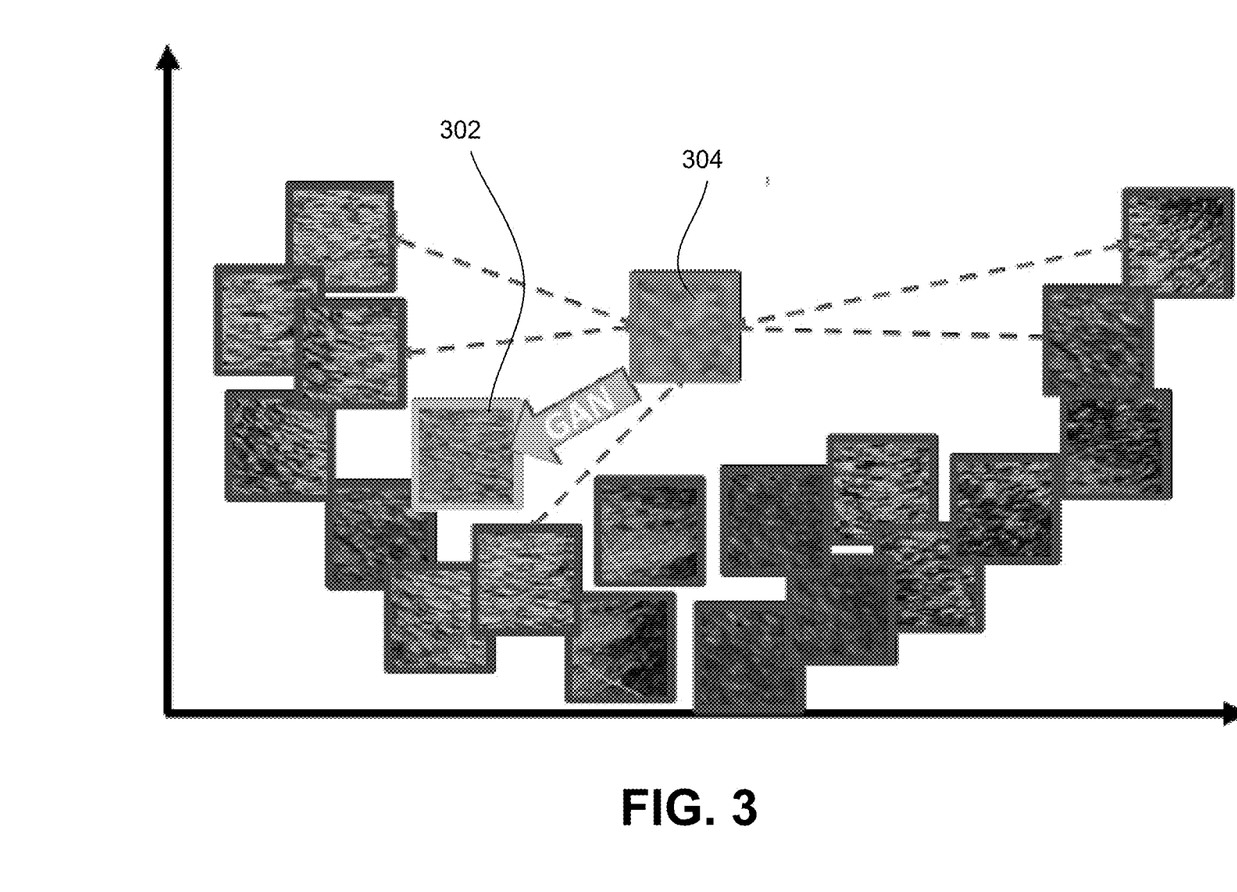
FIG. 3 is a schematic illustration of patches from the natural image manifold and super-resolved patches obtained with mean square error and generative adversarial networks.

As mentioned above, pixel-wise loss functions such as MSE struggle to handle the uncertainty inherent in recovering lost high-frequency details such as texture: minimizing MSE encourages finding pixel-wise averages of plausible solutions which are typically blurry, overly-smooth and thus have poor perceptual quality. Example reconstructions of varying perceptual quality are exemplified with corresponding PSNR in FIGS. 1A, 1B, 1C, and 1D. The problem of minimizing pixel-wise MSE is illustrated in FIG. 3, in which multiple potential solutions with high texture details are averaged to create a smooth reconstruction. As can be seen from FIG. 3, the generative adversarial network (GAN) approach can converge to a different solution 302 than the pixel-wise MSE approach 304, and the GAN approach can often result in a more photo-realistic solution than the MSE approach. For example, in FIG. 3, the MSE-based solution appears overly smooth due to the pixel-wise averaging of possible solutions in the pixel space, while the GAN approach drives the reconstruction towards the natural image manifold producing perceptually a more convincing solution.

Thus, Generative Adversarial Networks (GANs) can be used to tackle the problem of image super resolution. GANs can be used to learn a mapping from one manifold to another for style transfer, and for inpainting. In some implementations, high-level features extracted from a pretrained VGG network can be used instead of low-level pixel-wise error measures. In one implementation, a loss function based on the Euclidean distance between feature maps extracted from the VGG19 network can be used to obtain perceptually superior results for both super-resolution and artistic style-transfer.

Figure 4:
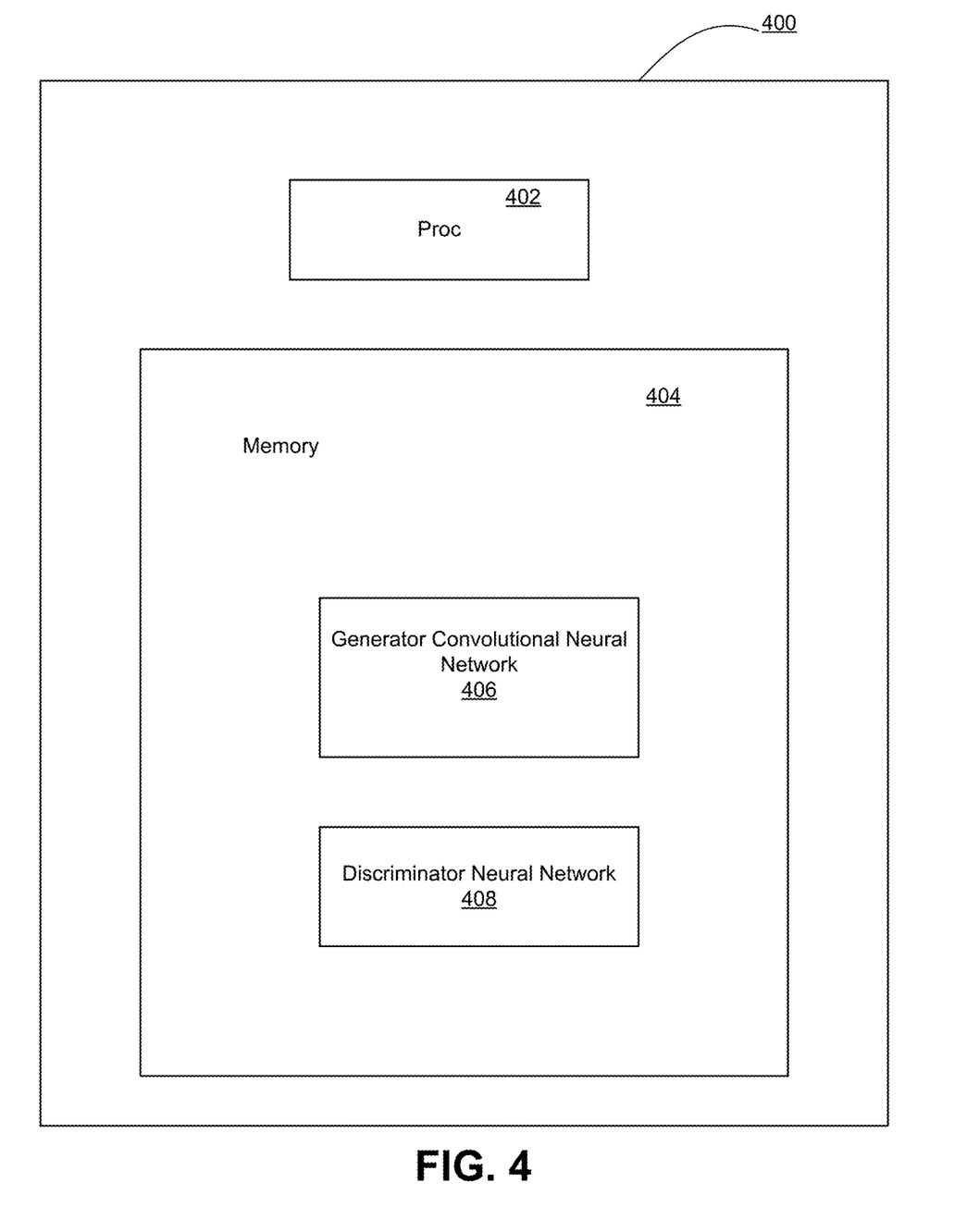
FIG. 4 is a schematic diagram of an example GAN framework for obtaining super resolution images.

FIG. 4 is a schematic diagram of an example GAN system 400 for obtaining super resolution images. GANs can provide a powerful framework for generating plausible-looking natural images with high perceptual quality. The GAN system 400 can include one or more computing devices that include one or more processors 402 and memory 404 storing instructions that are executable by the processors. A generator neural network 406 and a discriminator neural network 408 can be trained together (e.g, jointly, interatively, altenately, etc.) but with competing goals. The discriminator network 408 can be trained to distinguish natural and synthetically generated images, while the generator network 406 can learn to generate images that are indistinguishable from natural images by the best discriminator. In effect, the GAN system 400 encourages the generated synthetic samples to move towards regions of the search space with high probability and thus closer to the natural image manifold.

The SRGAN system 400 and its techniques described herein sets a new state of the art for image SR from a high downsampling factor (4×) as measured by human subjects using MOS tests. Specifically, we first employ the fast learning in low resolution (LR) space and batch-normalize to robustly train a network of a plurality (e.g., 15) of residual blocks for better accuracy.

With the GAN system 400 it is possible to recover photo-realistic SR images from high downsampling factors (e.g., 4×) by using a combination of content loss and adversarial loss as perceptual loss functions. For example, the adversarial loss is driven by the discriminator network 408 to encourage solutions from the natural image domain, while the content loss function ensures that the super-resolved images have the same content as their low-resolution counterparts. In addition, in some implementations, the MSE-based content loss function can be replaced with the Euclidean distance between the last convolutional feature maps of a neural network, where the similarities of the feature maps/feature spaces of the neural network are consistent with human notions of content similarity and can be more invariant to changes in pixel space. In one implementation, the VGG network can be used, as linear interpolation in the VGG feature space corresponds to intuitive, meaningful interpolation between the contents of two images. Although the VGG network is trained for object classification, here it can be used to solve the task of image super-resolution. Other neural networks also can be used or image super-resolution, for example, a network trained on a specific dataset (e.g., face recognition) may work well for super-resolution of images containing faces.

The approaches described herein can be validated using images from publicly available benchmark datasets and compared against previous works including SRCNN and DRCN to confirm our GAN system's 400 potential to compute photo-realistic image reconstruction under 4× downsampling factors as compared to conventional methods. In the following, the network architecture and the perceptual loss are described. In addition, quantitative evaluations on public benchmark datasets as well as visual illustrations are provided.

In SISR, a goal is to estimate a high-resolution, super-resolved image $I^{SR}$ from a low-resolution input image $I^{LR}$. Here, $I^{LR}$ is the low-resolution input image of its high-resolution counterpart $I^{HR}$. The high-resolution images can be provided during training of the networks 406, 408. In some implementations, when training the networks 406, 408, $I^{LR}$ can be obtained by applying a Gaussian-filter to $I^{HR}$ followed by a downsampling operation with a downsampling factor r. For an image with C color channels, $I^{LR}$ can be described by a real-valued tensor of size W×H×C and $I^{LR}$, $I^{SR}$ can be described by a real-valued tensor of size rW×rH×C.

A generating function G can be trained such that G estimates, for a given LR image, the corresponding HR counterpart image of the LR image. To achieve this, the generator network 406 can be trained as a feed-forward CNN, $G_{\theta_G}$, which is parameterized by $\theta_G$. Here, $\theta_G = \{W_{1:L}; b_{1:L}\}$ denotes the weights and biases of an L-layer deep network and is obtained by optimizing a SR-specific loss function $l^{SR}$. For given training images $I_n^{HR}$, for n=1, ... N, and with corresponding $I_n^{LR}$, for n=1, ... N, the following equation can be solved:

solve:

$$\hat{\theta}_G = \arg\min_{\theta_G} \frac{1}{N} \sum_{n=1}^{N} l^{SR}(G_{\theta_G}(I_n^{LR}), I_n^{HR}) \quad (1)$$

Here, a perceptual loss $l^{SR}$ is specifically designed as a weighted combination of several loss components that model distinct desirable characteristics of the recovered SR image. The individual loss functions are described in more detail below.

We can define a discriminator network, $N_{\theta_D}$, 408 in FIG. 4, which can be optimized alternating with $G\theta_G$ to solve the adversarial min-max problem:

$$\min_{\theta_G} \max_{\theta_D} \mathbb{E}_{I^{HR} \sim P_{train}(I^{HR})}[\log D_{\theta_D}(I^{HR})] + \quad (2)$$

-continued
$$\mathbb{E}_{I^{LR} \sim P_G(I^{LR})}[\log(1 - D_{\theta_D}(G_{\theta_G}(I^{LR})))]$$

This formulation therefore allows training a generative model G with the goal of fooling a differentiable discriminator D that was trained to distinguish super-resolved images from real images. With this approach, the generator can learn to create solutions that are highly similar to real images and thus difficult to classify by D. Eventually this encourages perceptually superior solutions residing in the subspace or the manifold of natural images. This is in contrast to SR solutions obtained by minimizing pixel-wise error measurements, such as the MSE.

Figure 5:
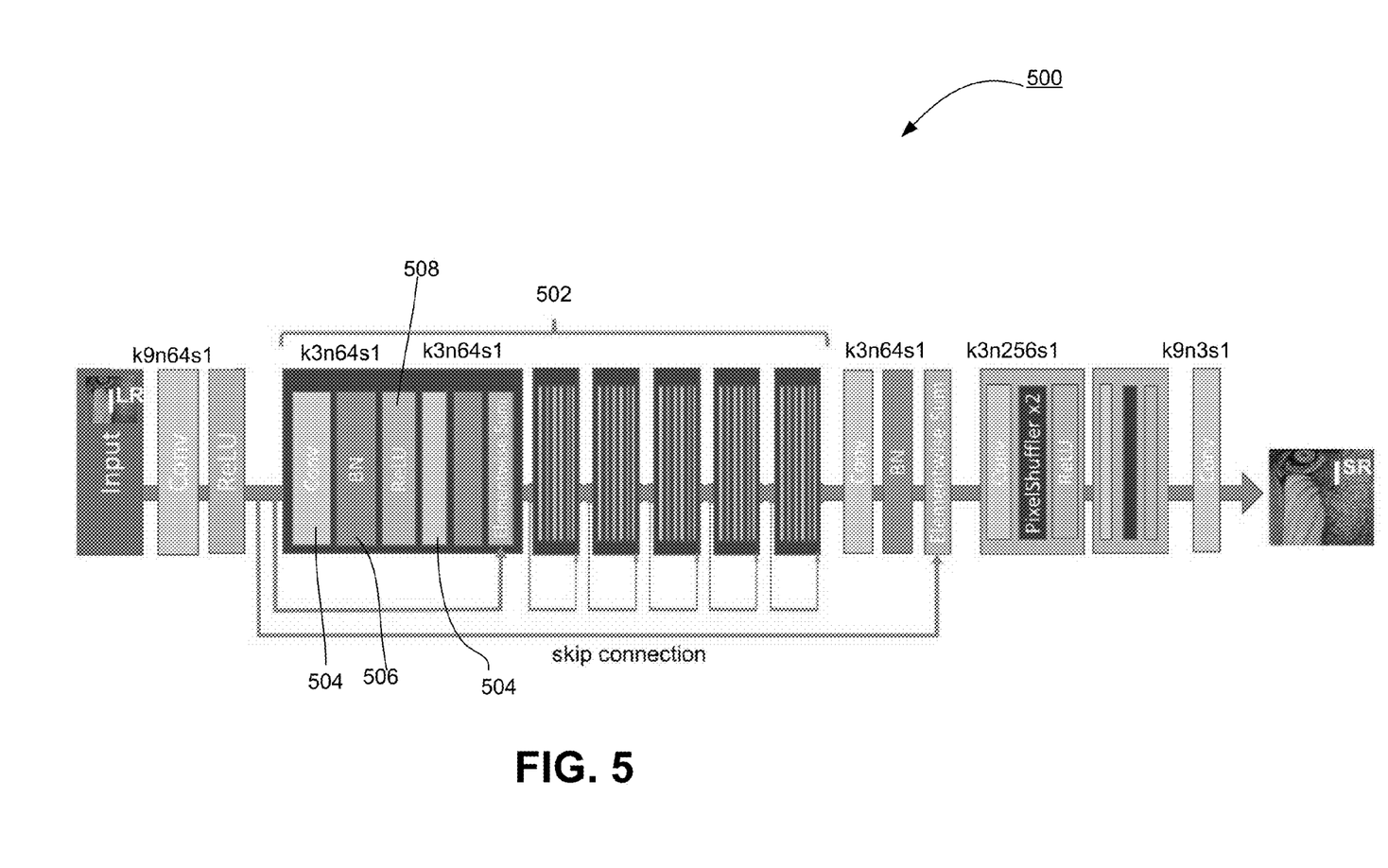
FIG. 5 is a schematic diagram of the generator network.

FIG. 5 is a schematic diagram of the generator network 500, which is also referred to herein a G. The generator network 500 can include B residual blocks 502 with identical layout. In some implementations, a residual block that uses two convolutional layers 504 with small 3×3 kernels and 64 feature maps can be used to stabilize, and allow the optimization of, a particularly deep neural network. Residual blocks are described in K. He, X. Zhang, S. Ren, and J. Sun, "Deep residual learning for image recognition," IEEE Conference on Computer Vision and Pattern Recognition (CVPR), pages 770-778, 2016, which is incorporated herein by reference, and can be used, e.g., to learn nontrivial parts of the transformation in the residual block, which allowing other parts of the transformation to be modeled elsewhere, e.g., via a skip connection. The residual block layer(s) can be followed by batch-normalization layers 506 and Rectified Linear Unit (PReLU) or parametric Rectified Linear Unit (PReLU) layers 508 as activation function to enable the network to learn complex, nonlinear functions. In PReLu all activations smaller than zero can be scaled with a learnable parameter and all activations larger than zero can be retained, as in ReLU.

We can further introduce a skip-connection over all residual blocks to relieve the network of modeling simple transformations (e.g., the identity transformation). The trained network thus can more effectively exploit network parameters for modeling complex nonlinear transformations. The resolution of the input image can be increased with a trained deconvolution layer that increases the spatial resolution of feature maps while reducing the number of feature channels.

Figure 6:
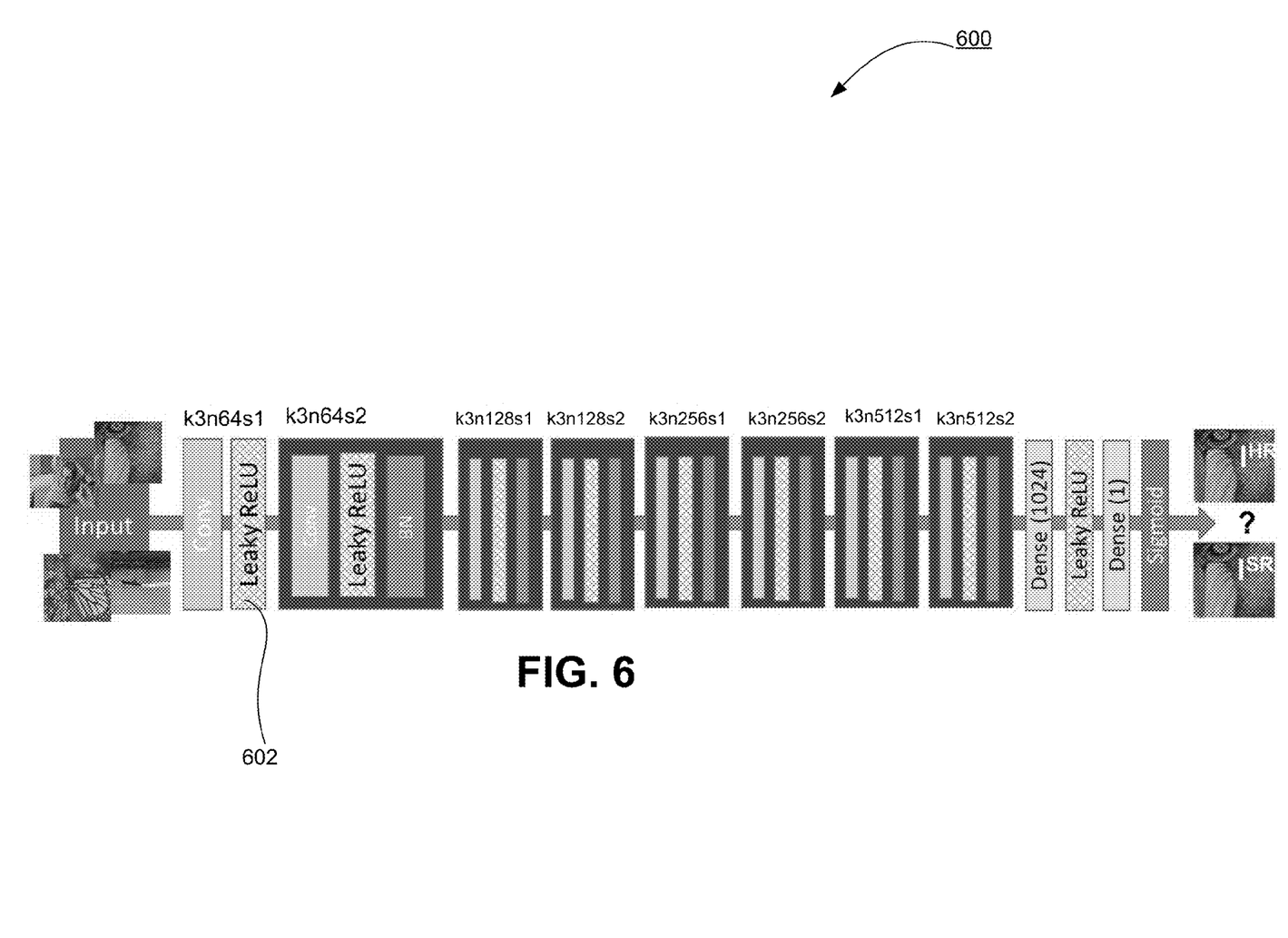
FIG. 6 is a schematic diagram of a discriminator network.

FIG. 6 is a schematic diagram of a discriminator network 600. To discriminate real HR images from generated SR samples the discriminator network 600 can be trained to solve the maximization problem in Equation 2. In one implementation, LeakyReLU activation 602 can be used and to avoid max-pooling throughout the network. In one implementation, the discriminator network 600 can include eight convolutional layers with an increasing number of filter kernels, increasing by a factor of 2 with each layer from 64 to 512 kernels, as in the VGG network. The spatial resolution of feature maps can be reduced each time the number of feature channels is doubled. Reducing the spatial resolution of feature maps can be achieved by specific network layers such as, for example, max-pooling or strided-convolutions. The last convolutional layer can have a larger number of feature maps, e.g. 512. To obtain a final probability for sample classification those numerous feature maps can be collapsed into a single scalar by employing one or more dense layers that accumulate each individual feature into a single scalar. This scalar can be converted into a probability for sample classification by applying a bounded activation function such as a sigmoid function.

Perceptual Loss Function

The definition of the perceptual loss function $l^{LR}$ influences the performance of the generator network and thus the SR algorithm. While $l^{LR}$ is commonly modeled based on the MSE, here a loss function that can assess the quality of a solution with respect to perceptually relevant characteristics is used instead.

Given weighting parameters $\gamma_i$, $i=1, \ldots, K$, the perceptual loss function $l^{LR}$ can be defined as the weighted sum of individual loss functions: $l^{LR} = \sum_{i=1}^{K} \gamma_i l_i^{SR}$. In particular, the perceptual loss function can include a content loss function, an adversarial loss function, and a regularization loss function, as explained in further detail below.

Content Loss

The pixel-wise MSE loss can be calculated as:

$$l_{MSE}^{SR} = \frac{1}{r^2 WH} \sum_{x=1}^{rW} \sum_{y=1}^{rH} (I_{x,y}^{HR} - G_{\theta_G}(I^{LR})_{x,y})^2 \quad (3)$$

which is a widely used optimization target for image SR on which many previous approaches rely. However, although achieving particularly high PSNR, solutions of MSE optimization problems often lack high-frequency content, which results in perceptually unsatisfying, overly smooth solutions, as can be seen from a comparison of FIGS. 1A, 1B, 1C, and 1D.

Reconstruction quality has commonly been assessed on a pixel-level in image space. For under-determined optimization problems, such as image super-resolution, artifact removal, this generally means optimizing for the mean (e.g., mean-squared-error, L2 loss) or median (L1 loss) of several, equally likely possible solutions. When optimizing for the average of a large number of possible solutions, the obtained result generally appears overly smooth and thus perceptually not convincing.

Instead of relying on such pixel-wise losses, a loss function that is closer to perceptual similarity can be used. In one implementation, this loss can be calculated in a more abstract feature space. The feature space representation of a given input image can be described by its feature activations in a network layer of a pre-trained convolutional neural network, such as, for example, the VGG19 network. A feature space can be explicitly or implicitly defined such that it provides valuable feature representations for optimization problems. For example, in image reconstruction problems losses calculated in feature space may not penalize perceptually important details (e.g., textures, high frequency information) of solutions, while at the same time, ensuring that overall similarity is retained.

In a particular example, within the VGG19 network, the feature map obtained by the jth convolution before the ith maxpooling layer within the VGG19 network can be represented by $\emptyset_{i,j}$. Then, the VGG loss can be defined as the Euclidean distance between the feature representations of a reconstructed image $G_{\theta_G}(I^{LR})$ and a reference image $(I^{HR})$ that the reconstructed image represents:

$$l_{VGG/i,j}^{SR} = \frac{1}{W_{i,j} H_{i,j}} \sum_{x=1}^{W_{i,j}} \sum_{y=1}^{H_{i,j}} (\phi_{i,j}(I^{HR})_{x,y} - \phi_{i,j}(G_{\theta_G}(I^{LR}))_{x,y})^2 \quad (4)$$

where $W_{i,j}$ and $H_{i,j}$ describe the dimensions of the respective feature maps within the VGG network.

Adversarial Loss

In addition to the content losses described so far, the generative component of the GAN can be added to the perceptual loss. This encourages the network to favor solutions that reside on the manifold of natural images by trying to fool the discriminator network. The generative loss $l_{Gen}^{SR}$ can be defined based on the probabilities of the discriminator $D_{\theta_D}(G_{\theta_G}(I^{LR}))$ over all training samples as:

$$l_{Gen}^{SR} = \sum_{n=1}^{N} -\log D_{\theta_D}(G_{\theta_G}(I^{LR})) \quad (5)$$

where $D_{\theta_D}(G_{\theta_G}(I^{LR}))$ is the estimated probability that the reconstructed image $G_{\theta_G}(I^{LR})$ is a natural HR image. Note that, in some implementations, for better gradient behavior, the term $-\log D_{\theta_D}(G_{\theta_G}(I^{LR}))$ can be minimized rather than the term $\log [1 - D_{\theta_D}(G_{\theta_G}(I^{LR}))]$.

Regularization Loss

In addition, a regularizer based on the total variation can be employed to encourage spatially coherent solutions. The regularization loss, $l_{TV}$, can be calculated as:

$$l_{TV}^{SR} = \frac{1}{r^2 WH} \sum_{x=1}^{rW} \sum_{y=1}^{rH} \|\nabla G_{\theta_G}(I^{LR})_{x,y}\| \quad (6)$$

Experiments

Data and Similarity Measures

To test the performance of the techniques and systems described herein, experiments were performed on the three widely used benchmark datasets Set5 (described in M. Bevilacqua, A. Roumy, C. Guillemot, and M. L. Albert-Morel, "Low-complexity single-image super-resolution based on nonnegative neighbor embedding," BMVC (2012), which is incorporated herein by reference), Set14 (described in D. Martin, C. Fowlkes, D. Tal, and J. Malik, "A database of human segmented natural images and its application to evaluating segmentation algorithms and measuring ecological statistics," IEEE International Conference on Computer Vision (ICCV), volume 2, pages 416-423, 200, which is incorporated herein by reference), and BSD100 (described in R. Zeyde, M. Elad, and M. Proffer, "On single image scale-up using sparse-representations," In Curves and Surfaces, pages 711-730, Springer, (2012), which is incorporated herein by reference). All experiments were performed with a downsampling factor of 4× used on the original images in the datasets. For fair quantitative comparison, all reported PSNR [dB] and SSIM measures were calculated on the y channel using the daala package available at github-.com/xiph/daala. Super-resolved images for the reference methods bicubic, SRCNN and Self-ExSR were obtained from github. com/jbhuang0604/SelfExSR and for DRCN from cv. snu. ac. kr/research/DRCN/.

Training Details and Parameters

All networks were trained on an NVIDIA Tesla M40 GPU using a random sample of a large number (e.g., tens or hundreds of thousands) of images from the ImageNet database. These images were distinct from the Set5, Set14 and BSD testing images. The LR images were obtained by downsampling the HR images using bicubic kernel with downsampling factor r=4. For each minibatch, 16 random 96×96 sub images of distinct training images were cropped. Note that the generator model was applied to images of arbitrary size, as it is fully convolutional. For optimization, Adam with $\beta_1 = 0.9$ was used. The SRRES networks were trained with a learning rate of $10^{-4}$ and $10^6$ update iterations.

We used the pre-trained MSE-based SRRES network as an initialization for the generator when training the actual GAN to avoid undesired local optima. All SRGAN network variants were trained with 100,000 update iterations at a learning rate of $10^{-4}$, and another 100,000 iterations at a lower learning rate of $10^{-5}$. We alternate updates to the generator and discriminator network. In one implementation, the generator network 406 can have 15 identical (B=15) residual blocks. With the help of the pretraining and the content loss function, the training of the generator and discriminator networks can be relatively stable.

The network architecture for the generator network 406 of GAN system 400 can combine the effectiveness of the efficient sub-pixel convolutional neural network (ESPCN) and the high performance of the ResNet. The performance of the generator network 406 for $l^{SR}=l_{MSE}^{SR}$ without any adversarial component, which can be referred to as SRResNet, was compared to bicubic interpolation and four state of the art frameworks: the super-resolution CNN (SRCNN), a method based on transformed self-exemplars (SelfExSR), a deeply-recursive convolutional network (DRCN), and the efficient sub-pixel CNN (ESPCNN) allowing real-time video SR. Quantitative results confirmed that SRResNet sets a new state of the art on the three benchmark datasets.

Investigation of Content Loss

The effect of different content loss choices in the perceptual loss for the GAN-based networks, which can be referred to as SRGAN, also were investigated. Specifically, the following losses were investigated:

$$l^{SR} = \underbrace{\underbrace{l_X^{SR}}_{content\ loss} + \underbrace{10^{-3} l_{Gen}^{SR}}_{adversarial\ loss}}_{perceptual\ loss\ (for\ VGG\ based\ content\ losses)} \quad (7)$$

The term $l_X^{SR}$ can represent different content losses, such as, for example, the standard MSE content loss, a loss defined on feature maps that represent lower-level features, a loss defined on feature maps of higher-level features from deeper network layers with more potential to focus on the content of the images, etc. It was determined that, even when combined with the adversarial loss, although MSE may provide solutions with relatively high PSNR values, the results achieved with a loss component more sensitive to visual perception provides are perceptually superior. This is caused by competition between the MSE-based content loss and the adversarial loss. In general, the further away the content loss is from pixel space, the perceptually better the result of the GAN system. Thus, we observed a better texture detail using the higher level VGG feature maps as compared with lower level feature maps.

The experiments suggest superior perceptual performance of the proposed framework purely based on visual comparison. Standard quantitative measures such as PSNR and SSIM clearly fail to capture and accurately assess image quality with respect to the human visual system. The presented model can be extended to provide video SR in real-time, e.g., by performing SR techniques on frames of video data. The techniques described herein have a wide variety of applications in which increasing the resolution of a visual image would be helpful. For example, the resolution of still, or video, images can be enhanced, where the images are uploaded to a social media site, where the images are provided to a live streaming application or platform, where the images are presented in a video game or media stream, where the images are rendered in a virtual reality application or where the images are part of a spherical video or 360-degree video/image, where the images are formed by a microscope or a telescope, etc. In addition, visual images based on invisible radiation (e.g., X-rays, MRI images, infrared images, etc.) also can be enhanced with the techniques described herein.

To generate photo-realistic solutions to the SR problem a content loss defined on feature maps of higher level features from deeper network layers with more potential to focus on the content of the images to yield the perceptually most convincing results, which we attribute to the potential of deeper network layers to represent features of higher abstraction away from pixel space. Feature maps of these deeper layers may focus purely on the content, while leaving the adversarial loss focusing on texture details that are the main difference between the super-resolved images without the adversarial loss and photo-realistic images. The development of loss functions that describe image spatial content, but that are orthogonal to the direction of the adversarial loss can further improve photo-realistic image SR results.

Aspects and/or implementations of the techniques described herein can improve the effectiveness of synthesizing content using machine learning techniques. Certain aspects and/or implementations seek to provide techniques for generating hierarchical algorithms that can be used to enhance visual data based on received input visual data and a plurality of pieces of training data. Other aspects and/or implementations seek to provide techniques for machine learning.

In some implementations, it is possible to overcome the problem of performing super-resolution techniques based on an MSE approach by using one or more generative adversarial networks, including a generating network and a discriminating network and by using one or more loss functions that are not based only on MSE, but that also can be based on other perceptual loss functions, e.g., content loss, adversarial loss, and a regularization loss. As mentioned above, a least-squares method picks an average of all possible solutions, thereby resulting in an output which may not accurately represent a higher quality version of the inputted visual data. In contrast, the techniques described herein select a most probable output when compared to a training dataset and an output that is most realistic, as determined by the discriminator.

Further implementations may use this approach to generate high quality versions of inputted low quality visual data by training an algorithm so that the generating function is optimized. In some implementations, only low-quality data is required along with a high-quality reference dataset that may contain unrelated visual data.

Figure 7:
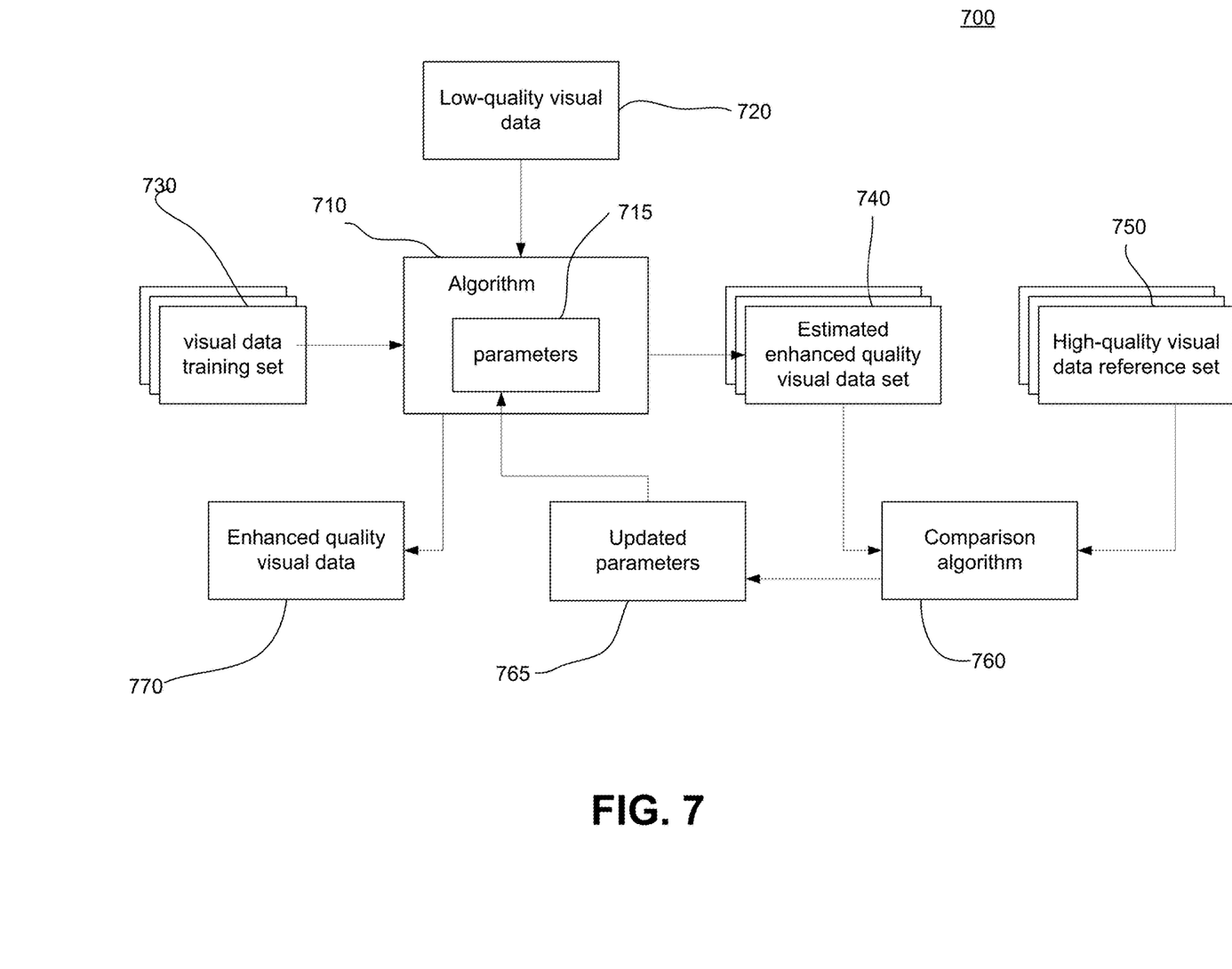
FIG. 7 is a flow chart of a process used to train a network.

An implementation is described in relation to FIG. 7, which shows a flow chart of a process used to train a network 710.

In one implementation, training the network 710 includes increasing the quality of the input visual data 720. It will be appreciated that the visual data can be processed in many ways, such as by creating photorealistic outputs, removing noise from received visual data, and generating or synthesizing new images. The network 710 receives at least one section of low-quality visual data 720 used to initialize the network 710 with a set of parameters 715. The network 710 may also receive a low-quality visual data training set 730. In some implementations, the plurality of low-quality visual data training set 730 may be a selection of low-quality images, frames of video data or rendered frames, although other types of low-quality visual data may be received by the network 710. The low-quality images or frames can include downsampled versions of high-quality images or frames.

The low-quality visual data training set 730 may be received by the network 710 from an external source, such as the Internet or may be stored in a memory of a computing device.

The low-quality visual data 720 can be used as a training dataset and can be provided to the network 710 that, using the parameters 715, seeks to produce estimated enhanced quality visual dataset 740 corresponding to the low-quality visual data training set 730. In some implementations, only a subset of the low-quality visual data 720 may be used when producing the estimate enhanced quality visual dataset 740. The estimated enhanced quality visual dataset 740 may include a set of visual data representing enhanced quality versions of the corresponding lower quality visual data from a subset of the low-quality visual data training set 730. In some implementations, the entire low-quality visual data training set 730 may be used.

In some implementations, the enhanced quality visual dataset 740 may be used as an input to a comparison network 760, along with a high quality visual data reference set 750. The high-quality visual data reference set 750 may be received by the network 710, from an external source, such as the Internet, or may be stored in a memory of a computing device that is used to train the network 710.

The comparison network 760 may use a plurality of characteristics determined from the high-quality visual data reference set 750 and the estimated enhanced quality visual dataset 740 to determine similarities and differences between the two datasets 740, 750. The comparison may be made between empirical probability distributions of visual data. The plurality of characteristics use may include sufficient statistics computed across subsets of visual data.

The comparison network 760 may utilize an adversarial training procedure such as the one used to train a Generative Adversarial Network (GAN) that includes, for example, a generating network and a discriminating network. In some implementations, such a comparison network 760 may use a discriminator trained to discriminate between data items sampled from the high-quality visual data reference set 750 and those sampled from the estimated enhanced quality visual dataset 740. The classification accuracy of this discriminator may then form the basis of the comparison.

The comparison network 760 can produce updated parameters 765 that can be used to replace the parameters 715 of the network 710. Using the updated parameters 765, the method may iterate, seeking to reduce the differences between the plurality of characteristics determined from the high-quality visual data 730 and the estimated enhanced quality visual data 740, each time using the updated parameters 765 produced by the comparison network 760.

The method continues to iterate until the network 710 produces an estimated enhanced quality visual data 740 representative of high quality visual data corresponding to the low-quality visual data training set 730. After training the network 710, an enhanced quality visual data 770 may be output, where the enhanced quality visual data 770 corresponds to an enhanced quality version of the at least one section of low-quality visual data 720.

In some implementations, the method may be used to apply a style transfer to the input visual data. For example, input visual data may include a computer graphics rendering, and the method may be used to process the computer graphics rendering. Using a photorealistic set of reference data 750, the output of the network 710 may appear to have photo-real characteristics to represent a photo-real version of the computer graphics rendering.

In some implementations, the trained network 710 may be used to recover information from corrupted, downsampled, compressed, or lower-quality input visual data, by using a reference dataset to recover estimates of the corrupted, downsampled, compressed, or lower-quality input visual data.

In yet further implementations, the trained network may be used for the removal of compression artifacts, dynamic range inference, image inpainting, image de-mosaicing, and denoising, from corrupted, downsampled, compressed, or lower-quality input visual data, thus allowing for a range of visual data to be processed, each with different quality degrading characteristics. It will be appreciated other characteristics that affect the quality of the visual data may be enhanced by the network. Furthermore, in some implementations, the network may be configured to process the visual data consisting of one or more of the above-mentioned quality characteristics.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art, and it should be understood that the implementations described herein have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A method for training a neural network to process at least a section of received low-resolution visual data to estimate a high-resolution version of the low-resolution visual data using a training dataset and reference dataset, the method comprising:
   (a) generating a set of training data;
   (b) training a generator convolutional neural network that is parameterized by first weights and biases by comparing one or more characteristics of the training data to one or more characteristics of at least a section of the reference dataset, wherein the generator convolutional neural network is trained to generate super-resolved image data from low-resolution image data and wherein the training includes modifying one or more of the first weights and biases of the generator convolutional neural network to optimize processed visual data based on the comparison between the one or more characteristics of the training data and the one or more characteristics of the reference dataset, wherein the modification is based on a perceptual loss function that includes a weighted combination of a content loss function, an adversarial loss function based on a discriminator network trained to differentiate between the super-resolved images and original photo-realistic images, and a regularization loss function that encourages spatially coherent solutions, wherein a first feature map of the neural network is generated by the neural network from the low-resolution image data and a second feature map of the neural network is generated from the super-resolved reference image data and wherein the content loss function is based on a Euclidean distance between the first and second feature maps, where similarities of the feature maps of the neural network are based on human notions of content similarity as determined based on object classification of training; and
   (c) training a discriminator convolutional neural network that is parameterized by second weights and biases by comparing one or more characteristics of the generated super-resolved image data to one or more characteristics of at least a section of the reference dataset, wherein the second network is trained to discriminate super-resolved image data from real image data.

2. The method of claim 1, wherein the training dataset includes a plurality of visual images.

3. The method of claim 1, wherein the reference dataset includes a plurality of visual images.

4. The method of claim 3, wherein the plurality of visual images of the reference dataset are not increased quality versions of the visual data of the training dataset.

5. The method of claim 1, further comprising:
generating an estimated high-resolution version of an input image by using the trained convolutional neural network on the input image, wherein the trained convolutional neural network is configured to remove compression artifacts from the input image to generate the estimated high-resolution version of an input image.

6. The method of claim 1, further comprising:
generating an estimated high-resolution version of an input image by using the trained convolutional neural network on the input image, wherein the trained convolutional neural network is configured to perform image de-mosaicing on the input image to generate the estimated high-resolution version of an input image.

7. The method of claim 1, further comprising:
generating an estimated high-resolution version of an input image by using the trained convolutional neural network on the input image, wherein the trained convolutional neural network is configured to perform image de-noising on the input image to generate the estimated high-resolution version of an input image.

8. The method of claim 1, wherein the generator convolutional neural network is hierarchical and includes a plurality of layers.

9. The method of claim 8, wherein the layers are any of sequential, recurrent, recursive, branching, or merging.

10. The method of claim 1, further comprising:
iterating over (a), (b), and (c); and
updating the training data during an iteration.

* * * * *